No. 627,927. Patented June 27, 1899.
C. B. LEBCHER.
CONTINUOUS CONTACT TROLLEY.
(Application filed Aug. 22, 1898.)
(No Model.) 2 Sheets—Sheet 2.
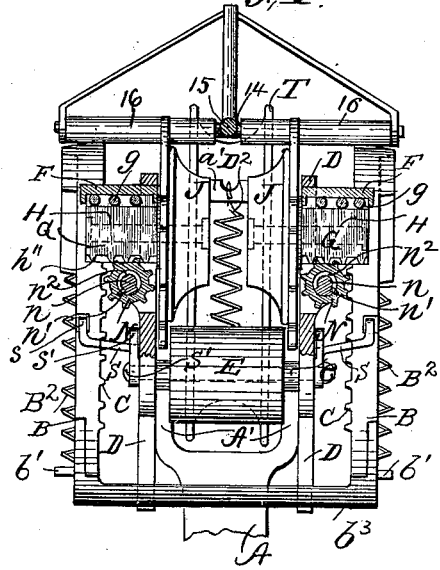
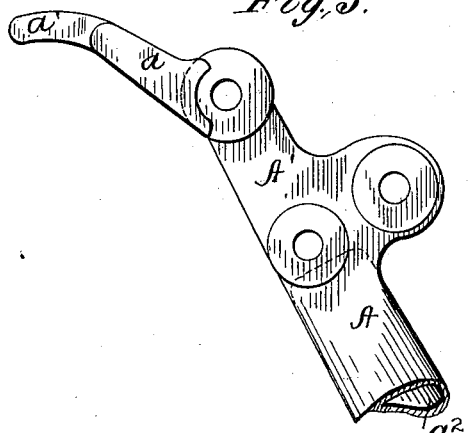
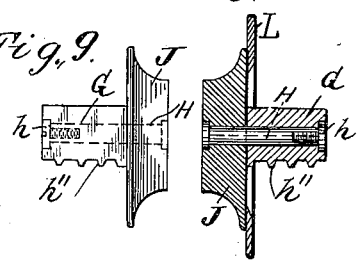
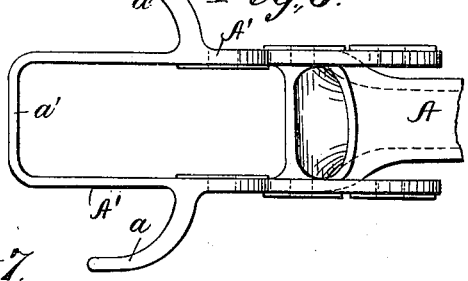
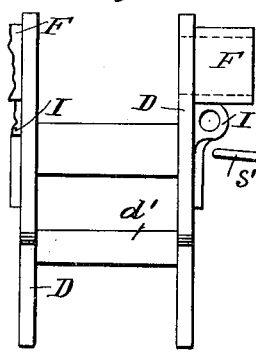
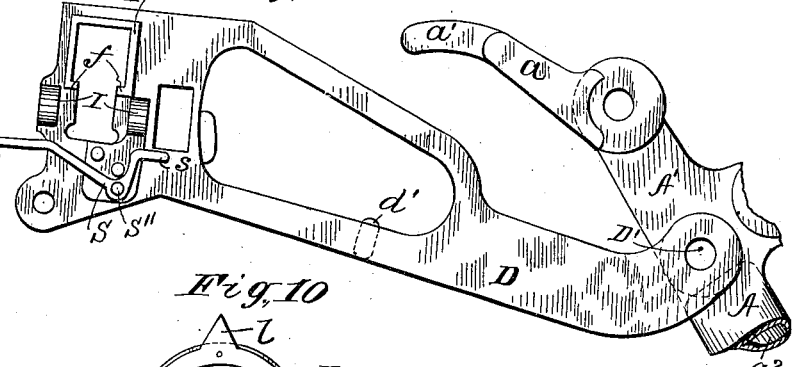
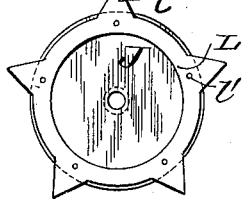
Witnesses.
W. R. Edelen.
H. Brownley
Inventor.
Chester B. Lebcher
by Jno. J. Johnston Atty.
THE NORRIS PETERS CO., PHOTO-LITHO., WASHINGTON, D. C.

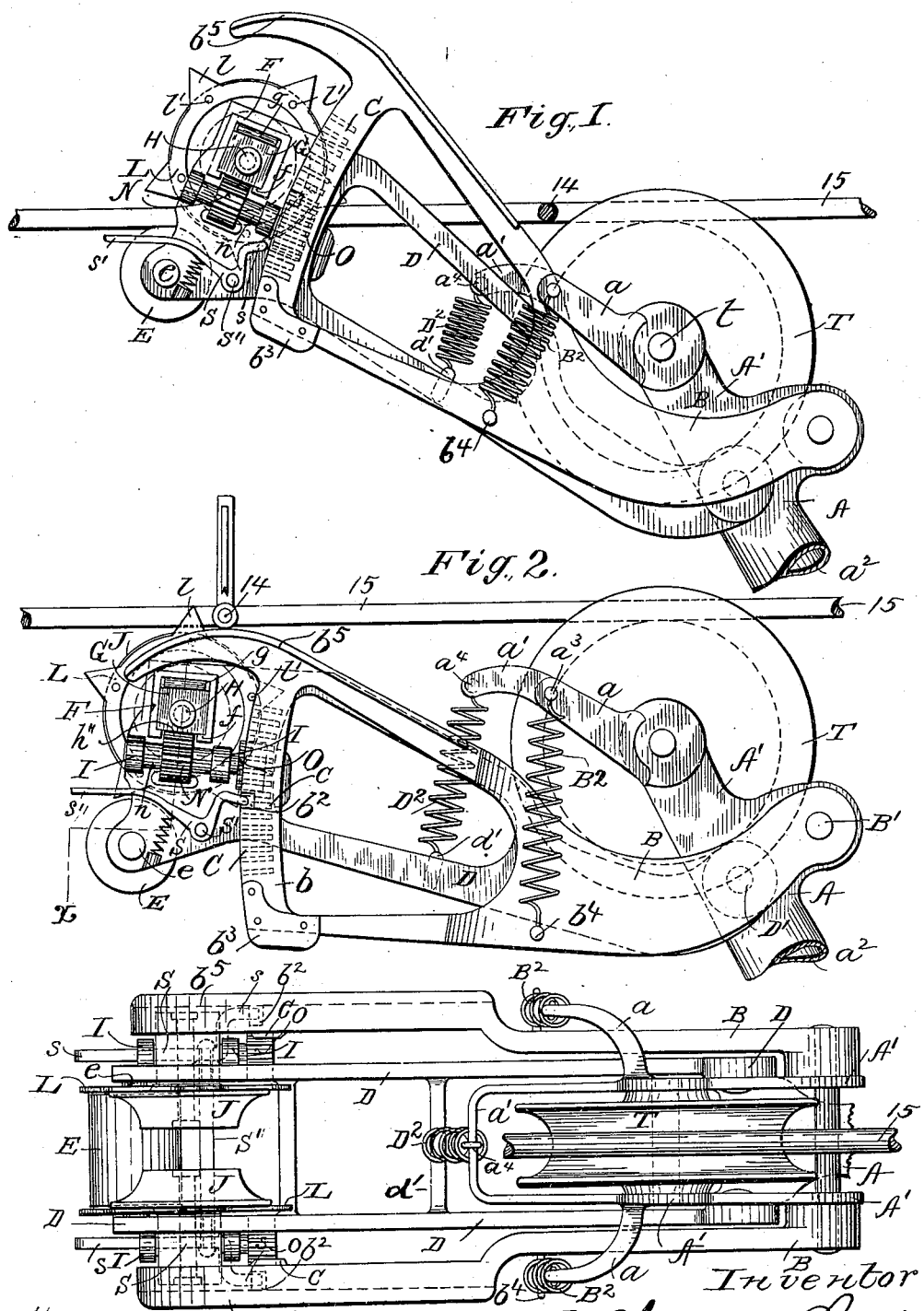

UNITED STATES PATENT OFFICE.

CHESTER B. LEBCHER, OF PLAINS, MONTANA.

CONTINUOUS-CONTACT TROLLEY.

SPECIFICATION forming part of Letters Patent No. 627,927, dated June 27, 1899.

Application filed August 22, 1898. Serial No. 689,179. (No model.)

*To all whom it may concern:*

Be it known that I, CHESTER B. LEBCHER, a citizen of the United States, residing at Plains, in the county of Missoula and State of Montana, have invented certain new and useful Improvements in Trolleys; and I do hereby declare the following to be a full, clear, and exact description of the invention, such as will enable others skilled in the art to which it appertains to make and use the same.

The invention relates to trolleys for electric railways; and it comprises a supplemental trolley in rear of the main trolley-wheel, and said supplemental trolley is normally above the electric or feed wire and resting on the top thereof, but when obstructions are met—as a hanger, switches, or cross-wires—is automatically brought underneath and in contact with the under side of the feed-wire by novel mechanism and after the obstruction is passed again automatically assumes its normal position above the feed or supply wire or conductor and the main trolley-wheel is then alone in operative engagement with the main trolley-wire or feed-wire on its under side, so that a contact is thus maintained.

The object of the invention is to obviate the frequent breaks in the circuit which are usual with the common trolley and which breaks are very injurious to the main or feed wire.

I will now proceed to describe the invention in such full, clear, concise, and exact terms that any person familiar with the art may construct and use the same.

Referring to the accompanying drawings, forming a part of this specification, and in which like letters and numerals indicate like parts in the different views, Figure 1 is a side elevation of the improved trolley with the supplemental trolley in the novel position above the feed-wire. Fig. 2 is a like view with the supplemental trolley in contact with the feed-wire, as in passing an obstruction. Fig. 3 is a top plan view of the device. Fig. 4 is a rear elevation of the device, partly in cross-section, on line $x$ of Fig. 2 to illustrate the shifting mechanism. Figs. 5 and 6 are plans and side elevations, respectively, of the trolley-head. Figs. 7 and 8 are side and rear elevations, respectively, of one of the frames for supporting the shifting mechanism. Fig. 9 represents the bisected roller or wheel, one part being shown in elevation and the other in section; and Fig. 10 is a side elevation of the bisected wheel, showing a star-wheel secured thereto.

A is the head or holder. It comprises a substantially C-shaped frame, with a socketed arm arranged at an angle thereto. The socket is represented at $a^2$ and is designed to receive the trolley rod or pole. The long arms of the C-shaped frame are represented at A' A', and they are connected at their inner ends by the cross bar or arm $a'$.

The arms A' A' are provided with bearings for the main trolley-wheel and also for the inner and outer frames B and D, as will be presently explained.

T represents the main trolley-wheel, and $t$ the shaft on which it is mounted to revolve between the arms A' A'. On the outer sides of the arms A' A', respectively, are curved arms or horns $a\ a$. These arms $a\ a$ are preferably arranged slightly in rear of the axle of the wheel T. The free ends of the curved arms or horns have coiled springs $B^2\ B^2$ secured to them, and the lower ends of these springs are secured to pins $b^4\ b^4$ on the outer frame B. A spring $D^2$ is secured to the short arm $a'$, and the opposite end of the spring is connected to a cross-bar $d'$ of the frame D, thus yieldingly supporting and holding the inner frame D in the proper position, as will be hereinafter explained.

The frames B and D, before mentioned, are secured to the head A. The frame D is composed of side pieces, which are substantially triangular in form, are pivoted to the head A at D', are connected by an intermediate cross-bar $d'$, and have mounted between their rear ends a bisected supplemental wheel J. The structure of the side parts is well shown in detail in Fig. 7.

Spring-actuated angular latches are secured on a single shaft S, one latch being arranged on each side of frame D. The latches have extended arms S', which act simultaneously when making contact with a cross-wire, (shown at 14.) The front end of the latches S are curved and adapted to engage notches in frame B, as will be explained later on.

The sides of frame D are provided with ways or guides F for the sliding blocks G G, and also adjacent to said ways F and near the lower ends thereof are journal-bearings I I for the short shafts $n$ $n$ of the gear-wheels N O. The return-flanges $f$ $f$ hold the sliding blocks in place.

The blocks G G are adapted to slide up and down laterally on the ways F, and on the under side they are provided with racks $h''$ $h''$, which are adapted to engage with the gear-wheels N. The sliding blocks carry or support shafts H H, on which are mounted, respectively, the two members of the bisected wheel J. These shafts are held in place by means of screws $h$ $h$.

Immediately above the blocks G G and resting against the guides or ways F are arranged antifriction-rollers $g$ $g$. A portion of the shafts $n$ $n$ are reduced in size or cut away, as at $n^2$ $n^2$, and they are provided with splines $h'$ $h'$, and by this means the gears are secured and rotated. The purpose of the second or cut-out portion is to provide for lost motion when the gears are operated by the segment-racks, as the travel of the arms of frame B, to be described, is relatively excessive as compared with the movement of the shifting blocks G for operating the wheel J.

Secured to the outer side of each member of the bisected wheel J is a star-wheel L, provided with teeth or points $l$ $l$, and secured to the sections of wheel J by rivets or pins $l'$.

The object of the star-wheels is to prevent the divided wheel from riding outside of the main or feed wire 15 when passing around curves.

By reference to Fig. 4 of the drawings it will be seen that the points of the star-wheel project above the main wire 15 and rest against the cross-wire 14, which in this view is provided with rolls 16, which may be made of gas-pipe, if desired. The object of this is to prevent wear on the cross-wire at the points of contact by the arms of frame B.

Underneath the bisected wheel J is a check or stop roll E, whose axis is mounted in suitable bearings in the rear lower end of frame D.

The frame B has the same general configuration in outline as the frame D; but it is somewhat wider at the rear than at the front. The side arms or members are pivoted to the head A by means of the shaft B', and at the rear they are connected by a transverse bar $b^3$. This frame B, like frame D, is somewhat in skeleton form, and the top bars of the side arms or pieces are extended forward and curved, as shown at $b^5$, to facilitate the making and breaking contact with cross-wire 14 or other obstructions.

The lower bars of the side pieces or arms of frame B are connected to the top bars by vertical segments or arc-shaped pieces $b$. The inner sides of these pieces $b$ are provided with racks for engaging the gear-wheels on frame D, and the edges of the pieces $b$ are also provided with notches $b^2$ for engaging the forward ends of the latches S.

The operation of the invention is as follows, viz: The head, with the main trolley-wheel, operates in the customary manner, the wheel being underneath and in contact with the supply or feed wire. The bisected or supplemental wheel is normally above and in contact with the top of the wire, and in this position the check or stop roll is in contact with the under side of the wire. The parts are held in this position by frame D through the medium of spring $D^2$, and the long side arms of frame B hold the parts of the bisected or supplemental wheel tightly together through the intervention of springs $B^2$, check C, and gears N and O. When the segment racks or frames B have moved downwardly sufficient to completely open the bisected wheel, the end of the spring-actuated catch S engages a notch $b^2$ in the edge of the arc-shaped parts of frame B, thus holding this frame in a depressed position for a short time, or until it shall have passed a short distance under the cross-wire or other obstruction. As the latch is on the frame D, the two frames B and D descend together against the tension of the respective spring, and as the device passes under the cross-wire (see Fig. 2) the points of the star-wheel are in engagement with the cross-wire, and thus prevent any undue lateral movement of the bisected supplemental wheel. When the trolley has passed the cross-wire, the parts assume the position shown in Fig. 1. The bisected wheel, however, remains open momentarily, or until the rear end $s'$ of the spring-latch strikes the cross-wire, when all the parts are again in their normal condition—that is, the main trolley-wheel in contact with the under side of the main wire and the supplemental or bisected wheel in contact with the top of the wire.

Minor changes in the details of the construction may be made within the scope of the invention without departing from the spirit or sacrificing any of the advantages thereof.

Having thus fully described the invention, what I claim as new, and desire to secure by Letters Patent, is—

1. In a trolley, a main trolley-wheel mounted to rotate on the trolley-head, two frames yieldingly mounted and pivoted to the trolley-head and extending rearwardly, the inner frame carrying a bisected supplemental wheel, and also a check or stop roll, the supplemental wheel resting normally on top of the feed-wire, and the check-roll underneath said wire, and means substantially as described for moving the supplemental bisected wheel underneath the feed wire or conductor, when an obstruction is met, as set forth.

2. In a trolley, a main trolley-wheel mounted to rotate on the trolley-head, two frames yieldingly pivoted to the trolley-head, and extending rearwardly, the inner frame carrying a bisected supplemental wheel with star-wheels secured to the outer sides of the members thereof, and also a check-roll, the supplemental wheel resting normally on the top of the feed-wire and the check-roll underneath said wire, and means substantially as described for moving the supplemental bisected wheel underneath the feed wire or conductor when an obstruction is met, substantially as set forth.

3. In a trolley, a main trolley-wheel mounted to rotate on the trolley-head, an inner frame carrying a bisected trolley-wheel, said frame pivoted at its rear end to the head, and yieldingly connected to the frame carrying the main wheel by means of springs secured to cross-bars on said frame, and an outer frame yieldingly connected to the trolley-head frame by means of arms or horns, on the trolley-head and springs between the ends of said arms and the frame, and means substantially as described for removing the bisected wheel out of contact with the top of the wire or conductor and bringing it into contact with the under side of same, substantially as described.

4. In a trolley, a main trolley-wheel mounted to rotate on the trolley-head, an inner frame yieldingly pivoted to said head, and carrying a bisected supplemental wheel, means for positively opening and closing the members of said wheel, an outer frame also yieldingly pivoted to the trolley-head, and means on the frames for removing the bisected wheel out of contact with the top or upper side of the wire or conductor and bringing it into contact with the under side of said wire, substantially as set forth.

5. In a trolley, a main trolley-wheel mounted to rotate on the trolley-head, an inner frame yieldingly pivoted to said head and carrying a bisected supplemental wheel, means for positively opening and closing the members of said wheel, an outer frame also yieldingly pivoted to the trolley-head, means on the frames for securing the bisected wheel out of contact with the upper side of the wire or conductor and bringing it into contact with the under side of said wire, and a latch for locking the two frames together at a predetermined period of their descent, substantially as set forth.

6. A trolley having a main wheel and a supplemental bisected wheel, the latter resting normally above the wire or conductor and adapted by means substantially as described to be brought on the under side of the wire or conductor when an obstruction is met, by said bisected wheel provided on the outer sides of its two members with star-wheels the points of which project beyond the peripheries of the two members of the bisected wheel, substantially as set forth.

7. In a trolley, a main trolley-wheel mounted to rotate on the trolley-head, an inner frame yieldingly pivoted to said head and carrying a bisected supplemental wheel, means for positively opening and closing the two members of said wheel, an outer frame also yieldingly pivoted to the trolley-head, means for removing the bisected wheel out of contact with the upper side of the wire or conductor and bringing it into contact with the under side of said wire, a latch for locking the two frames together at a predetermined period of their descent, said latch having a rearwardly-extending arm for automatically unlocking the same by contact with a cross-wire or other obstruction, substantially as set forth.

8. In a trolley, a main trolley-wheel mounted to rotate on the trolley-head, an inner frame yieldingly pivoted on said head, and carrying a bisected supplemental wheel mounted in movable bearings, the under sides of said bearings being formed as racks, and gear-wheels engaging said racks, an outer frame, provided with an extended curved arm at the top thereof, having its top and bottom bars connected by segmental vertical bars with racks on their inner sides to engage gear-wheels, said segments having notches in their rear edges, and a spring-actuated latch to engage with said notches, substantially as set forth.

In testimony whereof I affix my signature in presence of two witnesses.

CHESTER B. LEBCHER.

Witnesses:
WILLIAM B. RUSSELL,
JOSEPH THOMAS.